(12) United States Patent
Wang et al.

(10) Patent No.: US 11,608,914 B2
(45) Date of Patent: Mar. 21, 2023

(54) PIPE HOLDING CLIP

(71) Applicant: ILLINOIS TOOL WORKS INC., Glenview, IL (US)

(72) Inventors: Xing Wang, Shanghai (CN); Bo Li, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/517,980

(22) Filed: Nov. 3, 2021

(65) Prior Publication Data
US 2022/0136621 A1 May 5, 2022

(51) Int. Cl.
*F16M 11/00* (2006.01)
*F16L 3/12* (2006.01)

(52) U.S. Cl.
CPC ................ *F16L 3/1203* (2013.01)

(58) Field of Classification Search
CPC ......... F16L 55/035; F16L 3/1203; F16L 3/12; F16L 3/1226; F16L 3/13
See application file for complete search history.

(56) References Cited

U.S. PATENT DOCUMENTS

| 4,614,321 | A * | 9/1986 | Andre | B60T 17/046 |
| | | | | 248/74.2 |
| 7,278,190 | B2 * | 10/2007 | Fischer | F16L 3/223 |
| | | | | 248/74.2 |
| 7,328,538 | B2 * | 2/2008 | Trangsrud | E04C 5/20 |
| | | | | 52/682 |
| 9,273,804 | B2 * | 3/2016 | Shinoda | F16L 3/13 |
| 9,541,223 | B2 * | 1/2017 | Meyers | F16L 55/035 |
| 10,724,562 | B2 * | 7/2020 | Chlystek | B60R 16/08 |
| 2004/0113027 | A1 * | 6/2004 | Nakanishi | F16L 55/035 |
| | | | | 248/68.1 |
| 2013/0320182 | A1 * | 12/2013 | Kataoka | F16L 3/223 |
| | | | | 248/562 |

* cited by examiner

*Primary Examiner* — Amy J. Sterling
(74) *Attorney, Agent, or Firm* — Quarles & Brady LLP (57) ABSTRACT

The present disclosure relates to a pipe holding clip that defines a widthwise direction, a heightwise direction, and a lengthwise direction. The pipe holding clip can include a base portion, a pair of oppositely-arranged lateral portions extending upward from the base portion, a pair of holding arms extending inward from the pair of lateral portions and extending toward the base portion, and a support portion. Two sides of the support portion can be connected to the base portion or the pair of lateral portions. The support portion can include a working surface having an arc shape recessed toward the base portion. The pipe holding clip can provide a suitable holding force to limit the movement of a clamped pipe in an axial direction of the pipe.

20 Claims, 7 Drawing Sheets

PIPE HOLDING CLIP

RELATED APPLICATIONS

This application claims priority to Chinese Application No. 202011218461.8, filed on Nov. 4, 2020, and entitled "Pipe Holding Clip," which is incorporated herein by reference in its entirety.

TECHNICAL FIELD

The present disclosure relates to a pipe holding clip, and in particular, to a pipe holding clip capable of stably holding a pipe therein.

BACKGROUND ART

Some pipes are provided in a vehicle for conveying liquid or gas. These pipes are connected to other components or pipe components, usually with one or more interfaces. During the operation of the vehicle, due to the vibration of the vehicle, the pipes in a vehicle body may move relative to the vehicle body, thereby causing connection at the interfaces of the pipes to become loose. In order to prevent this situation, a pipe holding clip is usually used to hold the pipe and prevent the movement of the pipe. The pipe holding clip is connected to the vehicle body, and the pipe is fixed in the pipe holding clip, so that the pipe is stably held in the vehicle body.

SUMMARY OF THE INVENTION

The present disclosure provides a pipe holding clip for holding a pipe in a vehicle. The pipe holding clip has a widthwise direction, a heightwise direction, and a lengthwise direction, and the pipe holding clip comprises: a base portion; a pair of oppositely-arranged lateral portions, the pair of lateral portions being formed by extending upward from the base portion; a pair of holding arms, the pair of holding arms respectively extending inward from the pair of lateral portions and toward the base portion; and a support portion, two sides of the support portion being connected to the base portion or the pair of lateral portions, a certain distance being provided between the support portion and the base portion and between the support portion and the pair of lateral portions, the support portion having a working surface, and the working surface being in a shape recessed toward the base portion; wherein the support portion is located below the pair of holding arms, and a space for clamping is formed between the pair of holding arms and the working surface.

In the pipe holding clip described above, the support portion comprises a first support section and a second support section, and the first support section and the second support section are arranged in the widthwise direction of the pipe holding clip, the first support section comprises a first arc-shaped working surface, the second support section comprises a second arc-shaped working surface, and a central axis of the first working surface and a central axis of the second working surface are staggered in the lengthwise direction of the pipe holding clip.

In the pipe holding clip described above, the first working surface has a first left side working surface and a first right side working surface, the second working surface has a second left side working surface and a second right side working surface, the first left side working surface and the second right side working surface are respectively located on two sides of the central axis of the first working surface and the central axis of the second working surface, and the second left side working surface and the first right side working surface are respectively located on two sides of the central axis of the first working surface and the central axis of the second working surface; wherein the space for clamping is configured to accommodate the clamped pipe, and when the first support section and the second support section are in a free state, on a projection plane in the widthwise direction of the pipe holding clip, a maximum distance between the first left side working surface and the second right side working surface in the lengthwise direction of the pipe holding clip is smaller than a diameter of the clamped pipe.

In the pipe holding clip described above, two sides of the first support section are connected to the base portion or the pair of lateral portions, and two sides of the second support section are connected to the base portion or the pair of lateral portions.

In the pipe holding clip described above, the pipe holding clip further comprises: a pair of first connecting portions and a pair of second connecting portions, the first support section being connected to the base portion or the pair of lateral portions through the pair of first connecting portions, and the second support section is connected to the base portion or the pair of lateral portions through the pair of second connecting portions.

In the pipe holding clip described above, the first support section comprises a first support section left end and a first support section right end, at least one of the first connecting portions is connected to the first support section at a position lower than a corresponding one of the first support section left end and the first support section right end, so that at least one of the first support section left end and a first support section right end of the first support section forms a first support section free end; and the second support section comprises a second support section left end and a second support section right end, at least one of the pair of second connecting portions is connected to the second support section at a position lower than a corresponding one of the second support section left end and the second support section right end, so that at least one of the second support section left end and the second support section right end of the second support section forms a second support section free end.

In the pipe holding clip described above, the first support section has one first support section free end, the second support section has one second support section free end, and the first support section free end and the second support section free end are arranged on two sides of the central axis of the first working surface.

In the pipe holding clip described above, the pipe holding clip further comprises: a reinforcing portion, the reinforcing portion being located below the support portion and connected to the support portion, a hollow space being provided between the reinforcing portion and the support portion, and a distance being provided between the reinforcing portion and the base portion.

In the pipe holding clip described above, in extension directions of both the central axis of the first working surface and the central axis of the second working surface, a distance is provided between the first support section and the second support section.

In the pipe holding clip described above, the pipe holding clip is integrally formed by using an injection molding process.

The pipe holding clip according to the present disclosure has a improved holding force and can effectively limit the sliding of the pipe relative to the pipe holding clip in an axial direction of the pipe. Moreover, the pipe holding clip according to the present disclosure requires a relatively small insertion force, so that the pipe can be easily installed into the pipe holding clip.

DETAILED DESCRIPTION OF EMBODIMENTS

Various specific embodiments of the present invention are described below with reference to the accompanying drawings which constitute part of this description. It should be understood that although the directional terms such as "front", "rear", "upper", "lower", "left", and "right" are used in the present disclosure to describe various exemplary structural parts and elements of the present disclosure, these terms used herein are merely used for ease of description and are determined based on the exemplary orientation shown in the accompanying drawings. Since the embodiments disclosed in the present disclosure can be arranged in different directions, these terms indicating directions are merely illustrative and should not be considered as limitations. If possible, the same or similar reference numerals used in the present disclosure refer to the same components.

Figure 1A:
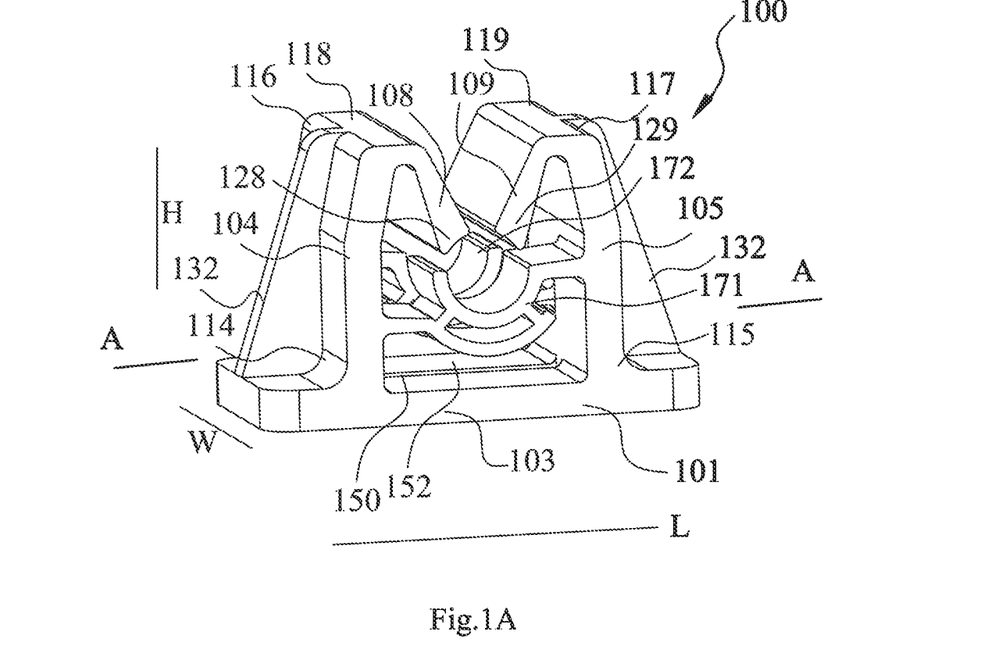
FIG. 1A is a perspective view of a pipe holding clip according to an embodiment of the present disclosure.
Figure 1B:
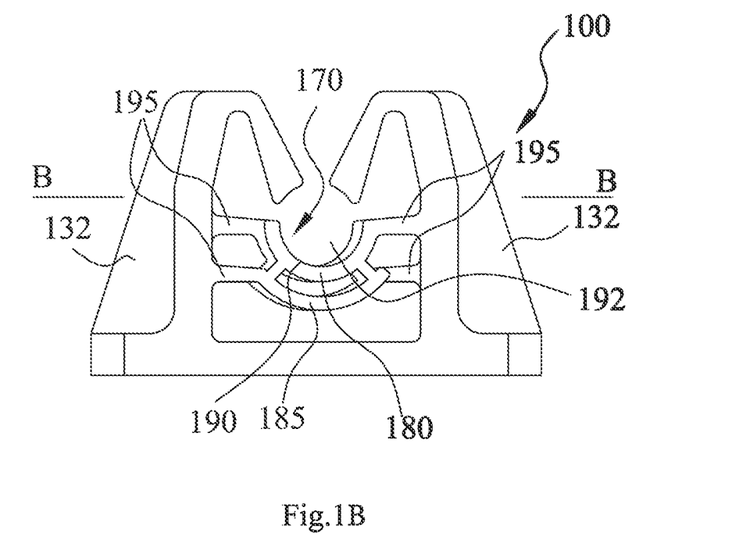
FIG. 1B is a side view of the pipe holding clip in FIG. 1A.

FIG. 1A is a perspective view of an embodiment of a pipe holding clip, FIG. 1B is a side view of the pipe holding clip in FIG. 1A, and FIG. 1A and FIG. 1B illustrate the general configuration of the pipe holding clip. As shown in FIG. 1A and FIG. 1B, the pipe holding clip 100 comprises a base portion 103, a pair of lateral portions 104 and 105, a pair of holding arms 108 and 109, and a holding portion 170. As shown in FIG. 1A, the pipe holding clip 100 has a lengthwise direction L, a widthwise direction W, and a heightwise direction H. The base portion 103 is substantially in a flat plate shape and has an upper surface 150, and the pair of lateral portions 104 and 105 respectively extend upward from the upper surface of the base portion 103. The pair of lateral portions 104 and 105 are respectively close to two sides of the base portion 103 in a lengthwise direction. The pair of lateral portions 104 and 105 are respectively provided with far ends 116 and 117 away from the base portion 103, and the pair of holding arms 108 and 109 are respectively formed by extending downward from the far ends 116 and 117 of the lateral portions 104 and 105 and extending toward each other. The pair of holding arms 108 and 109 has elasticity, near ends 118 and 119 of the pair of holding arms 108 and 109 are respectively connected to the far ends 116 and 117 of the lateral portions 104 and 105, and distances are provided between far ends 128 and 129 of the pair of holding arms 108 and 109 and the pair of lateral portions 104 and 105 respectively, so that if the pair of holding arms 108 and 109 are deformed, the far ends 128 and 129 of the pair of holding arms 108 and 109 deflect toward the pair of lateral portions 104 and 105 respectively. Outer sides of the pair of lateral portions 104 and 105 are respectively provided with reinforcing ribs 132, and the reinforcing ribs 132 are connected to outer surfaces of the pair of lateral portions 104 and 105 and the upper surface of the base portion 103, to support the pair of lateral portions 104 and 105 and prevent the pair of lateral portions 104 and 105 from being excessively deformed away from each other.

The holding portion 170 is disposed in a space surrounded by the base portion 103, the pair of lateral portions 104 and 105, and the pair of holding arms 108 and 109. The holding portion 170 comprises a support portion 180 and a connecting structure 195, and the support portion 180 is connected to the pair of lateral portions 104 and 105 through the connecting structure 195. The support portion 180 has a supporting surface 190, and the supporting surface 190 and the pair of holding arms 108 and 109 enclose a space for clamping 192. The space for clamping 192 is configured to accommodate the clamped pipe. A reinforcing portion 185 is arranged below the support portion 180, and a hollow space is provided between the reinforcing portion 185 and the support portion 180. The holding portion 170 comprises a first section 171 and a second section 172 that are arranged in the widthwise direction of the pipe holding clip 100. A distance is provided between the first section 171 and the second section 172 to form two relatively independent sections. The first section 171 and the second section 172 are similar in structure, and the structure of the holding portion will be described below with reference to FIG. 2 by taking the first section 171 as an example.

The pipe holding clip according to the present disclosure is integrally formed by a thermoplastic material by using an injection molding process. In the present disclosure, the material of the pipe holding clip makes the pipe holding clip have certain elasticity as well as strength.

Figure 2:
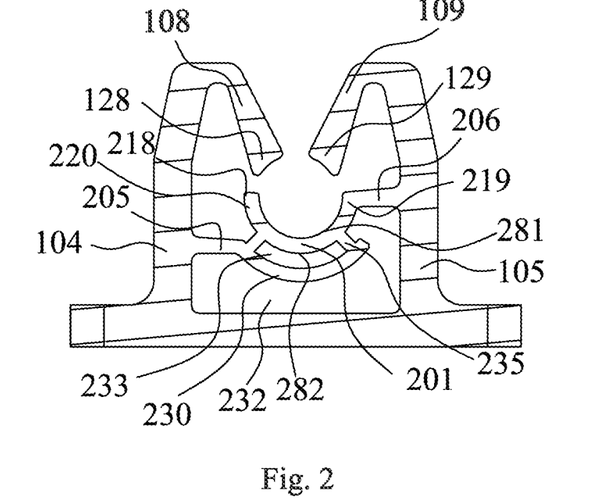
FIG. 2 is a vertical cross-sectional view of the pipe holding clip taken along line A-A in FIG. 1A.

FIG. 2 is a cross-sectional view of the pipe holding clip 100 in FIG. 1A taken along line A-A and is used to show the specific structure of the first section 171 of the holding portion 170. As shown in FIGS. 1A, 1B, and 2, the first section 171 has a first support section 201, a pair of connecting portions 205 and 206 and a reinforcing portion 230. The first support section 201 is roughly in an arc shape, and has a working surface 281 facing the pair of holding arms 108 and 109 and a lower surface 282 facing the base portion 103. The cross-section of the working surface 281 is roughly semicircular. The working surface 281 is configured to be in contact with the clamped pipe. End surfaces of the far ends 128 and 129 of the pair of holding arms 108 and 109 are arc-shaped, and the end surfaces of the far ends 128 and 129 are on the same circumference as the working surface 281. The support portion 201 has a first support section left end 218 close to the lateral portion 104 and a first support section right end 219 close to the lateral portion 105 in the lengthwise direction of the pipe holding clip 100, and the top of the first support section left end 218 and the top of the first support section right end 219 are in flush in the heightwise direction of the pipe holding clip 100. The pair of connecting portions 205 and 206 respectively connect two sides of the support portion 201 to the pair of lateral portions 104 and 105. A joint between the connecting portion 206 and the first support section 201 is flush with the first support section right end 219 in height. The joint between the connecting portion 205 and the first support section 201 is lower than the top of the first support section left end 218, so that a portion of the first support section left end 218 higher than the first support section 201 forms a free end 220, and the free end 220 is more likely to be deformed than the first support section right end 219. When compressed by an external force, the free end 220 is likely to deflect toward the lateral portion 104. The connecting portion 205 and the connecting portion 206 are arranged roughly parallel to the base portion 103 and at certain distances from the base portion 103 in the heightwise direction. The reinforcing portion 230 is disposed below the first support section 201, one end of the reinforcing portion 230 is connected to the first connecting portion 205, and the other end thereof is connected to the first support section 201 at a position close to the first support section right end 219 through a beam 235. A distance is provided between the reinforcing portion 230 and the first support section 201, thereby forming a space 233, which facilitates downward deformation of the first support section 201. A hollow space 232 is provided between the reinforcing portion 230 and the base portion 103, which facilitates downward deformation of the reinforcing portion 230.

The second section 172 of the holding portion 170 is similar in structure to the first section 171 thereof, except that the second section 172 and the first section 171 are arranged in opposite directions in the lengthwise direction of the pipe holding clip 100.

Figure 3:
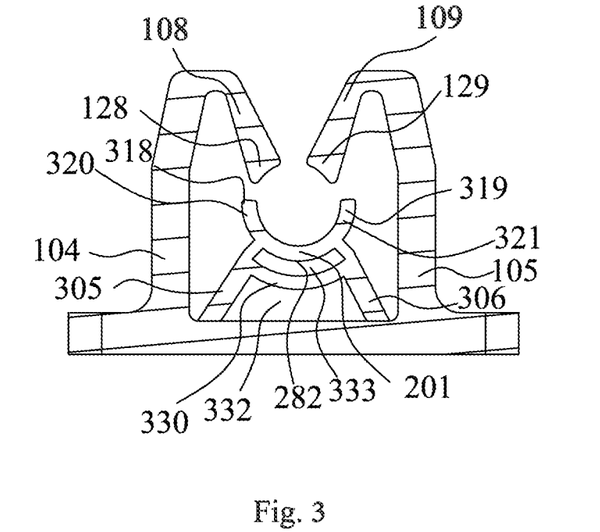
FIG. 3 is a vertical cross-sectional view of a pipe holding clip according to another embodiment of the present disclosure.

FIG. 3 is a cross-sectional view of another embodiment of a pipe holding clip, and the description about the parts similar to those of the embodiment shown in FIG. 2 will be omitted. The difference from the embodiment shown in FIG. 2 is that a connecting portion 305 and a connecting portion 306 of the pipe holding clip of FIG. 3 are respectively connected to the first support section 201 and the base portion 103. A joint between the connecting portion 305 and the first support section 201 and a joint between the connecting portion 306 and the first support section 201 are respectively close to a first support section left end 318 and a first support section right end 319 of the first support section 201 and are both lower than tops of the first support section left end 318 and the first support section right end 319, so that portions of both the first support section left end 318 and the first support section right end 319 higher than the connecting portion 305 and the connecting portion 306 in the heightwise direction form free ends 320 and 321. Distances are respectively provided between the free end 320 and the lateral portion 104 and between the free end 321 and the lateral portion 105, so that the free end 320 and the free end 321 are easily deformed toward the pair of lateral portions 104 and 105. In this embodiment, by adjusting a difference between heights of both the joint between the connecting portion 305 and the first support section 201 and the joint between the connecting portion 306 and the first support section 201, and heights of both the top of the first support section left end 318 and the top of the first support section right end 319, the ease of deformation of the first support section left end 318 and the first support section right end 319 can be adjusted. The connecting portion 305 and the connecting portion 306 extend from the lower surface 282 of the first support section 201 toward the base portion 103 and away from each other until they are connected to the base portion 103. A reinforcing portion 330 is located below the first support section 201 and at a distance from the lower surface 282 of the first support section 201, thereby forming a space 333. Two ends of the reinforcing portion 330 are respectively connected to the connecting portion 305 and the connecting portion 306. A distance is provided between the reinforcing portion 330 and the base portion 103, thereby forming a space 332. The space 332 and the space 333 respectively provide a deformation space for the first support section 201 and the reinforcing portion 330. When the first support section 201 and the reinforcing portion 330 are subjected to a downward force, they can be deformed downwardly more easily. Inner sides of the connecting portion 305 and the connecting portion 306 each form an acute angle with the base portion 103 instead of being perpendicular to the base portion 103. Such an arrangement facilitates the downward deformation of the first support section 201.

Figure 4A:
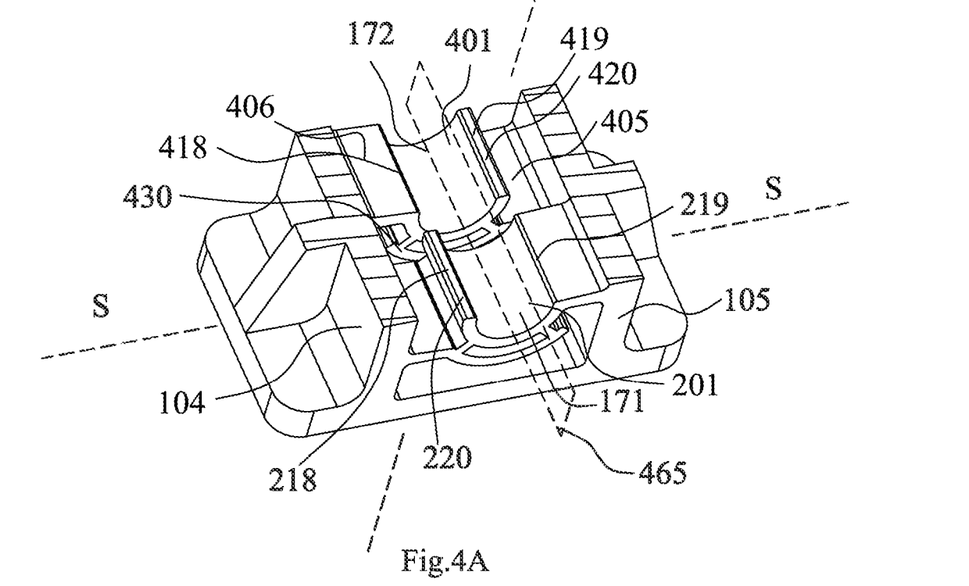
FIG. 4A is a cut-away perspective view seen from the top of the pipe holding clip taken along line B-B in FIG. 1A.
Figure 4B:
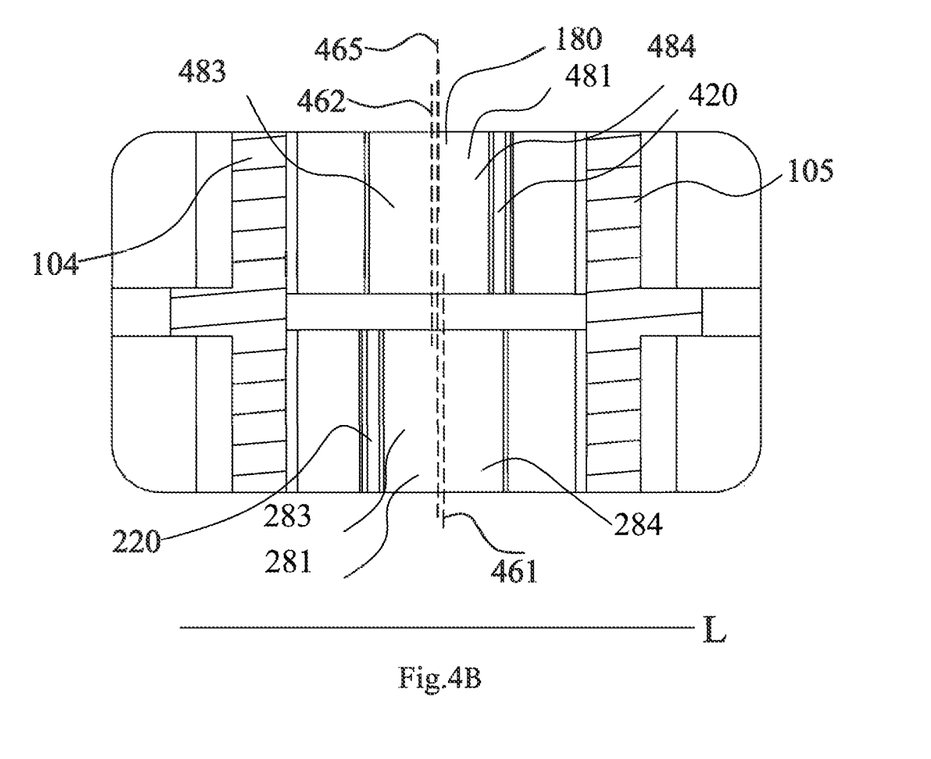
FIG. 4B is a bottom view of the pipe holding clip in FIG. 4A.

FIG. 4A is a cut-away perspective view of the pipe holding clip 100 in FIG. 1A taken along line B-B, as viewed from the top, and FIG. 4B is a bottom view of the pipe holding clip 100 in FIG. 4A. As shown in FIG. 4A and FIG. 4B, the pipe holding clip 100 has a central plane 465, and the central plane 465 extends in the widthwise direction and the heightwise direction of the pipe holding clip 100 and passes through a midpoint in the lengthwise direction of the pipe holding clip 100. The second section 172 of the holding portion has a second support section 401, a pair of connecting portions 405 and 406 and a reinforcing portion 430. The second support section 401 is connected to the pair of lateral portions 104 and 105 through the pair of connecting portions 405 and 406. The reinforcing portion 430 is disposed below the second support section 401. The second support section 401 has a working surface 481, a second support section left end 418 and a second support section right end 419. In the lengthwise direction of the pipe holding clip 100, arrangement directions of the pair of connecting portions 205 and 206 of the second section 171 and the pair of connecting portions 405 and 406 of the first section 172 are opposite. That is, the connecting portion 405 of the second section 172 is connected to the lateral portion 105, and the connecting portion 406 is connected to the lateral portion 104. A free end 420 of the second support section 401 of the second section 172 is close to the lateral portion 105, so that the free end 220 of the first support section 201 of the first section 171 and the free end 420 of the second support section 401 of the second section 172 are respectively located on two sides of the central plane 465 in the lengthwise direction of the pipe holding clip. In the widthwise direction, a distance is provided between the first section 171 and the second section 172, so that when deformed, the first holding portion section 171 and the second holding portion section 172 do not interfere with each other.

Still as shown in FIG. 4A and FIG. 4B, the working surface 281 of the first support section 201 of the first section 171 of the holding portion is roughly semicircular and has a central axis 461, and the working surface 481 of the second support section 401 of the second section 172 of the holding portion is roughly semicircular and has a central axis 462. In the lengthwise direction of the pipe holding clip 100, the central axis 461 of the working surface 281 and the central axis 462 of the working surface 481 are staggered from each other, are respectively located on two sides of the central plane 465, and are symmetrical with respect to the central plane 465. The central axis 461 of the working surface 281 is closer to the lateral portion 105 than the central axis 462 of the working surface 481. That is to say, the central axis 461 is located on the right side of the central plane 465, and the central axis 462 is located on the left side of the central plane 465. That is, the central axis 461 is located on the side of the central plane 465 close to the lateral portion 105, and the central axis 462 is located on the side of the central plane 465 close to the lateral portion 104. The distance between the central axis 461 of the working surface 281 and the central axis 462 of the working surface 481 in the lengthwise direction of the pipe holding clip 100 is within an appropriate range, for example, the distance is less than ½ of the diameter of the working surface 481. In the lengthwise direction of the pipe holding clip 100, the first support section left end 218 is closer to the central plane 465 than the second support section left end 418, and the first support section right end 219 is closer to the central plane 465 than the second support section right end 419.

As shown in FIG. 4B, the working surface 281 has a left side working surface 283 and a right side working surface 284, and the left side working surface 283 and the right side working surface 284 are respectively located on two sides of the central axis 461. The working surface 481 has a left side working surface 483 and a right side working surface 484, and the left side working surface 483 and the right side working surface 484 are located on two sides of the central axis 462. The left side working surface 283 of the working surface 281 is closer to the central plane 465 than the right side working surface 284, and the right side working surface 484 of the working surface 481 is closer to the central plane 465 than the left side working surface 483. When the first support section 201 and the second support section 401 are in a free state, on a projection plane in the widthwise direction of the pipe holding clip 100, a maximum distance between the first left side working surface 283 and the second right side working surface 484 in the lengthwise direction of the pipe holding clip is smaller than a diameter of the clamped pipe. That is to say, the maximum distance from the first left side working surface 283 to the central plane 465 and the maximum distance from the second right side working surface 484 to the central plane 465 are both smaller than the radius of the clamped pipe. In this embodiment, cross-sections of the working surface 281 and the working surface 481 are both in a semicircular shape symmetrical with respect to the central plane 465. The distance from the top of the first left side working surface 283 and the distance from the second right side working surface 484 to the central plane 465 are the farthest, i.e., the distance between the top of the first left side working surface 283 and the top of the second right side working surface 484 in the lengthwise direction of the pipe holding clip 100 is smaller than the diameter of the clamped pipe.

When entering the support portion 180, the pipe (not shown) is first in contact with the top of the first support section left end 218 and the top of the first support section right end 219. Then an external force is applied to the pipe, and the first support section left end 218 and the first support section right end 219 will be deformed first. Since configured to have free ends, the first support section left end 218 and the first support section right end 219 can be deformed relatively easily. When the pipe is installed into the pipe holding clip 100, since the central axes of both the working surface 281 and the working surface 481 are not on the same straight line, directions of elastic forces generated by the first support section 201 and the second support section 401 due to deformation are opposite. This will enable the pipe to be held in the pipe holding clip 100 stably.

In another embodiment of the present disclosure, it is also possible to include only one holding portion. For example, the pipe holding clip 100 is cut along line S-S, and only the first section 171 remains. This design should also fall within the scope of protection of the present invention.

Figure 5A:
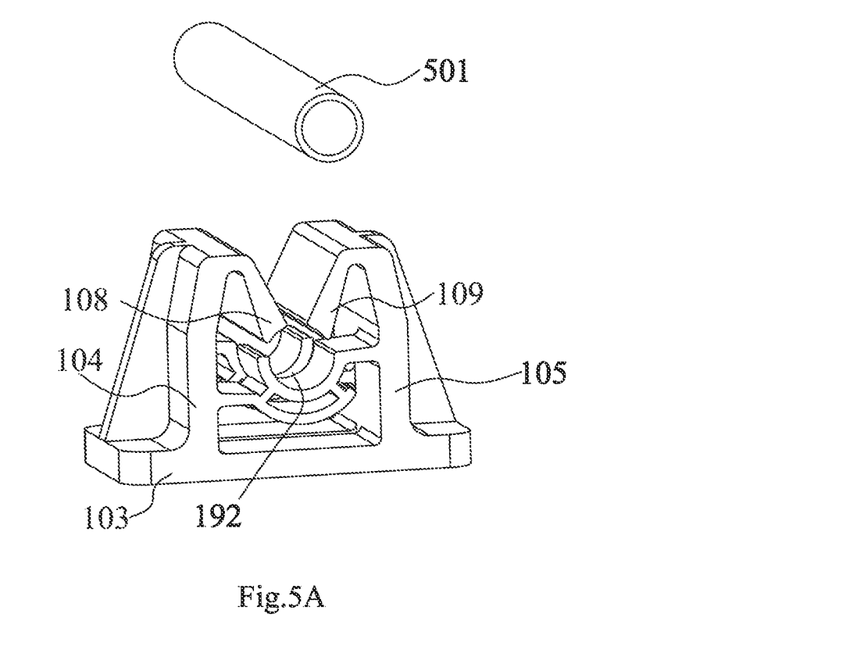
FIG. 5A is a perspective view of the pipe holding clip in FIG. 1A and a pipe.
Figure 5B:
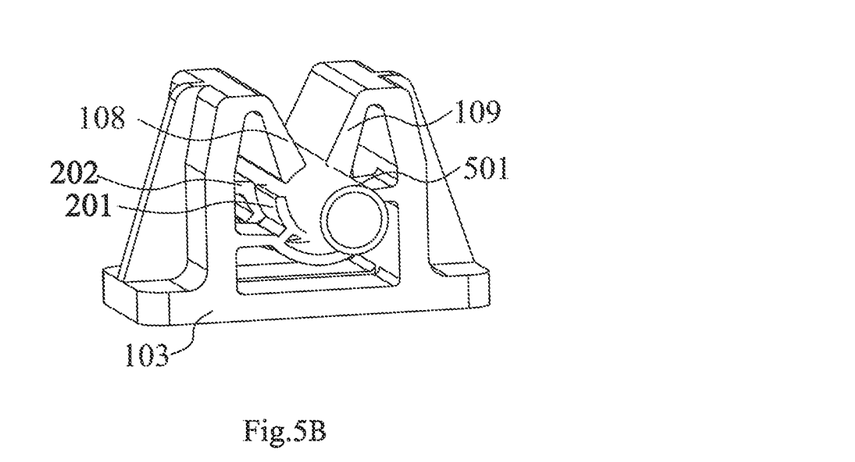
FIG. 5B is a perspective view of the pipe installed in the pipe holding clip in FIG. 1A.

FIG. 5A is a perspective view of the pipe holding clip 100 in FIG. 1A and a pipe, and FIG. 5B is a perspective view of the pipe installed in the pipe holding clip 100 in FIG. 1A, showing a relationship between the pipe holding clip and the pipe to be installed. As shown in FIGS. 5A and 5B, when a pipe 501 is installed into the pipe holding clip 100, the pipe 501 is placed in such a direction that an axial direction of the pipe 501 is consistent with the widthwise direction of the pipe holding clip 100, then the pipe 501 is placed above the pipe holding clip 100 and faces a space between the pair of holding arms 108 and 109, and the pipe 501 continues to be pressed downward; then the pipe 501 compresses the pair of holding arms 108 and 109 outward, so as to pass through the pair of holding arms 108 and 109 and be in contact with the working surface 281 of the first support section 201 and the working surface 481 of the second support section 401, and then the pair of holding arms 108 and 109 restores from deformation, so that the pipe 501 is held between the pair of holding arms 108 and 109 and the first support section 201 and the second support section 401 and does not easily slide in the pipe holding clip 100. This process will be described below in conjunction with FIG. 6A to FIG. 6C.

Figure 6A:
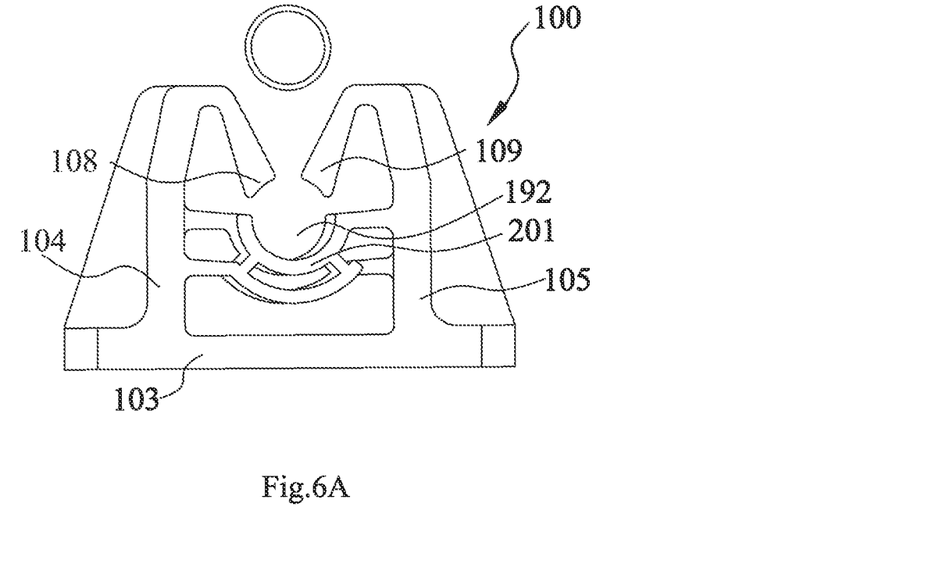
FIG. 6A is a side view of the pipe in a first position relative to the pipe holding clip in FIG. 1A.
Figure 6B:
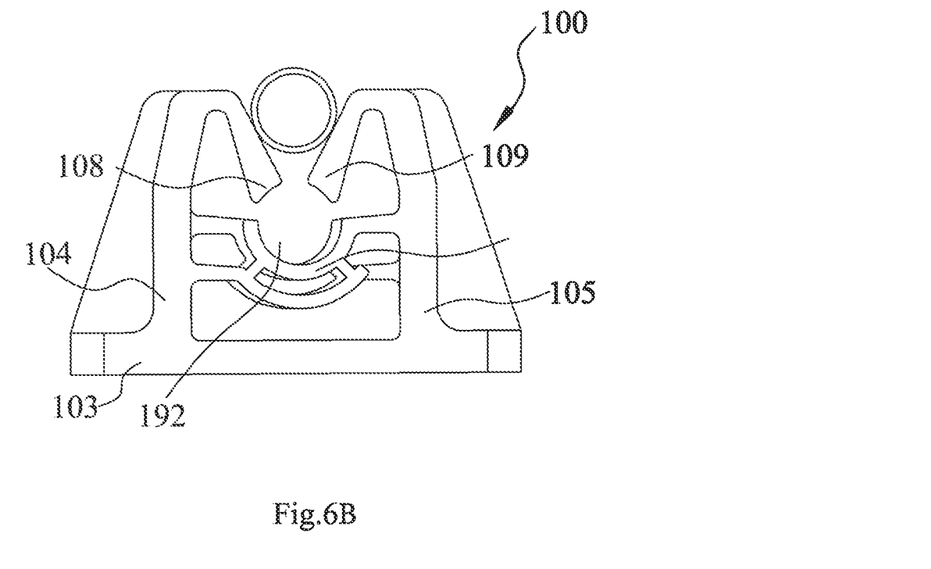
FIG. 6B is a side view of the pipe in a second position relative to the pipe holding clip in FIG. 1A.
Figure 6C:
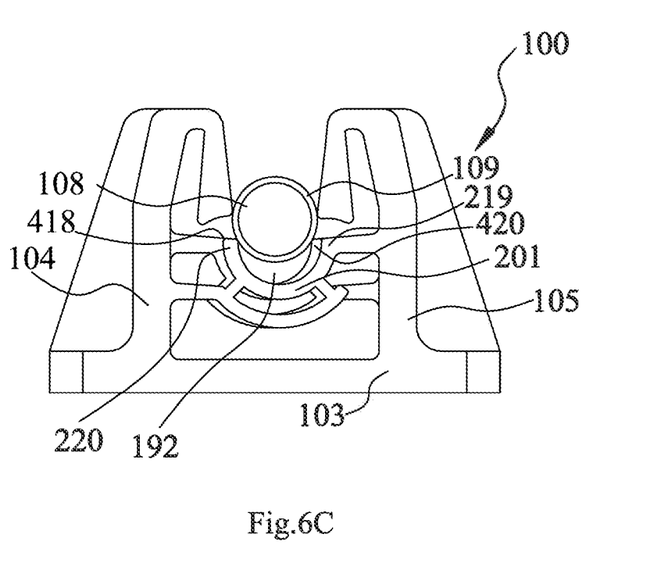
FIG. 6C is a side view of the pipe in a third position relative to the pipe holding clip in FIG. 1A.
Figure 6D:
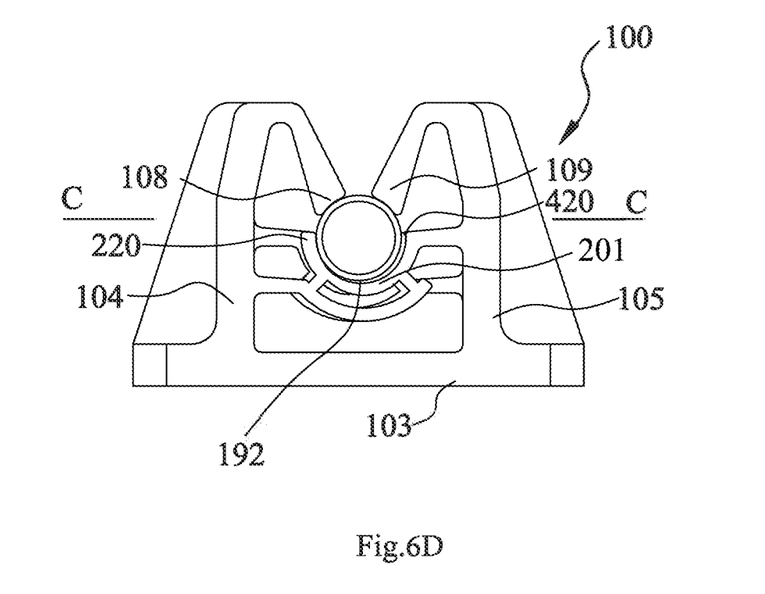
FIG. 6D is a side view showing that the pipe has been installed in the pipe holding clip in FIG. 1A in place.

FIG. 6A is a side view when the pipe is in a first position relative to the pipe holding clip in FIG. 1A, FIG. 6B is a side view when the pipe is in a second position relative to the pipe holding clip in FIG. 1A, FIG. 6C is a side view when the pipe is in a third position relative to the pipe holding clip in FIG. 1A, and FIG. 6D is a side view showing that the pipe has been installed in the pipe holding clip in FIG. 1A in place. FIG. 6A, FIG. 6B, FIG. 6C and FIG. 6D show the process of installation of the pipe 501.

As shown in FIG. 6A, when the pipe 501 is prepared to be installed, the pipe 501 is placed above the pair of holding arms 108 and 109, and the pipe 501 is aligned with the space for clamping 192. At this time, the pipe 501 is in the first position relative to the pipe holding clip 100.

As shown in FIG. 6B, the pipe 501 continues to be moved toward the first support section 201, and the outer periphery of the pipe 501 is in contact with the pair of holding arms 108 and 109. Since the distance between the far ends 128 and 129 of the pair of holding arms 108 and 109 is smaller than the diameter of the pipe 501, the pair of holding arms 108 and 109 will prevent the pipe 501 from continuing to move toward the first support section 201. At this time, the pipe 501 is in the second position relative to the pipe holding clip 100.

As shown in FIG. 6C, when an external force is applied to the pipe 501 so that the pipe 501 continues to move toward the space for clamping 192, the pair of holding arms 108 and 109 is compressed by the pipe and is deformed toward the pair of lateral portions 104 and 105, so that the distance between the far ends 128 and 129 of the pair of holding arms 108 and 109 is increased, so that the pipe 501 can pass through the pair of holding arms 108 and 109, so as to be in contact with the free end 220 of the first support section 201 and the free end 420 of the second support section 401. At this time, the pipe 501 is in the third position relative to the pipe holding clip 100. Since the central axes of the first support section 201 and the second support section 401 are staggered, at this position, the pipe is blocked by the free end 220 of the first support section 201 and the free end 420 of the second support section 401, so that the pipe is located at a position with a distance from the bottoms of the working surface 281 and the working surface 481 and with a distance from the first support section right end 219 of the first support section 201 and the second support section left end 418 of the second support section 401.

As shown in FIG. 6D, when the downward external force continues to be applied to the pipe 501, the pipe 501 compresses the free end 220 and the free end 420 and makes them deformed toward the lateral portions 104 and 105, so that the pipe 501 enters the space enclosed by the working surface 281 and the working surface 481. The working surface 281 and the working surface 481 will be under pressure to enable the first support section 201 and the second support section 401 for the pipe to be deformed and move downward by a distance. At this time, the pipe 501 is disengaged from the pair of holding arms 108 and 109, so that the pair of holding arms 108 and 109 restores from deformation and reaches the position where the pair of holding arms are in the free state. Then the external force applied to the pipe 501 is withdrawn, the first support section 201 and the second support section 401 restore or partially restore from the downward deformation, and the pipe 501 is in contact with the far ends 128 and 129 of the pair of holding arms 108 and 109. The pair of holding arms 108 and 109 confines the pipe 501 within the pipe holding clip 100, so that the pipe 501 cannot move in a radial direction of the pipe 501 relative to the pipe holding clip 100. The free end 220 of the first support section 201 applies an elastic force toward the lateral portion 105 to the pipe 501, and the free end 420 of the second support section 401 applies an elastic force toward the lateral portion 104 to the pipe 501, so that the pipe 501 is clamped by the first support section 201 and the second support section 401 and cannot move in the axial direction of the pipe 501. At this time, the pipe 501 is installed in place in the pipe holding clip.

Figure 7:
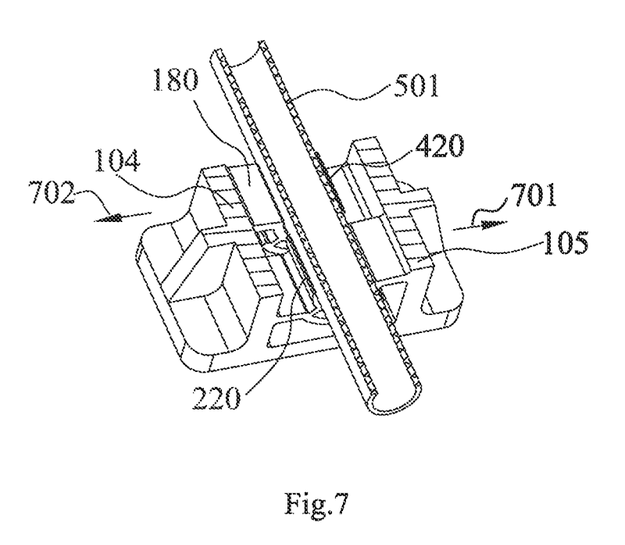
FIG. 7 is a cut-away perspective view of the pipe and the pipe holding clip taken along line C-C in FIG. 6D.

FIG. 7 is a cut-away perspective view of the pipe and the pipe holding clip taken along line C-C in FIG. 6D to show a positional relationship between the pipe and the pipe holding clip. As shown in FIG. 7, the pipe 501 is located between the first support section 201 and the second support section 401. As shown in FIG. 4B, the central axis of the first support section 201 is close to the lateral portion 105 and the central axis of the second support section 401 is close to the lateral portion 104. The pipe 501 is a rigid body relative to the pipe holding clip 100. When the pipe 501 is installed into the pipe holding clip 100, it compresses the first support section 201 and the second support section 401. The free end 220 of the first support section 201 is deformed toward the lateral portion 104, thus applying an elastic force toward the lateral portion 105 as indicated by arrow 701, and the free end 420 of the second support section 401 is deformed toward the lateral portion 105, thus applying an elastic force toward the lateral portion 104 as indicated by arrow 702. That is to say, the pipe 501 are subjected to directional elastic forces in opposite directions at the position respectively corresponding to the two sections of the support portion 180 in the axial direction, so that the pipe 501 is clamped by the support portion 180. Compared with one support portion, elastic forces provided by the two support portions make the pipe 501 more stable in the pipe holding clip 100.

A distance is provided between the first support section 201 and the second support section 401, and a distance is also provided between the pair of connecting portions 205 and 206 connected to the first support section 201 and the pair of connecting portions 405 and 406 connected to the second support section 401. Therefore, the deformation of the first support section 201 and the second support section 401 will not interfere with each other, which will make the first support section 201 and the second support section 401 deformed more easily.

The pipe holding clip 100 according to the present disclosure can secure the pipe in a specific position and prevent the pipe from moving. The pipe is held in the pipe holding clip by the pair of holding arms 108 and 109 and the first holding portion section 171 and the second holding portion section 172. The pair of holding arms 108 and 109 limits the movement of the pipe 501 in the radial direction of the pipe 501, and the first support section 201 and the second support section 401 support and clamp the pipe 501, thus limiting the movement of the pipe 501 in the axial direction of the pipe 501 (i.e., the widthwise direction of the pipe holding clip).

The pipe holding clip 100 according to the present disclosure requires a relatively small insertion force while being able to ensure stable holding of the pipe in the pipe holding clip 100.

According to the present disclosure, two support sections, i.e. first support section 201 and the second support section 401 placed side by side, are provided, and central axes of the first support section 201 and the second support section 401 are staggered from each other, so that after the pipe enters the first support section 201 and the second support section 401, the first support section 201 and the second support section 401 respectively apply elastic forces in opposite directions to the pipe, thereby clamping the pipe 501 and limiting the movement of the pipe 501 in the axial direction of the pipe 501. The staggered arrangement of the central axes of the first support section 201 and the second support section 401 makes the pipe holding clip 100 have a strong clamping force, and the pipe 501 is stably held in the pipe holding clip 100, so that the pipe 501 installed in the pipe holding clip 100 does not easily slide in the axial direction relative to the pipe holding clip.

When the pipe 501 is inserted into the pipe holding clip 100, the ease of deformation of the pair of holding arms 108 and 109 and the support portion 180 together affect the insertion force. A distance is provided between the far ends 128 and 129 of the pair of holding arms 108 and 109 and the lateral portions 104 and 105 to form a sufficient deformation space to facilitate the deformation of the pair of holding arms 108 and 109. At the same time, the pair of holding arms 108 and 109 has a certain length in the extending direction, that is to say, a distance is provided between the far ends 128 and 129 of the pair of holding arms 108 and 109 and the far ends 116 and 117 of the lateral portions 104 and 105. When the far ends 128 and 129 are deformed by an external force, a moment arm is longer and the deformation is easier. Compared with the support portion 180, the pair of holding arms 108 and 109 deform more easily, thus having less effect on the insertion force of the pipe holding clip 100. According to the present disclosure, the support portion 180 comprises a first support section 201 and a second support section 401. The first support section 201 and the second support section 401 are each at a distance from the base portion 103 and can be easily deformed toward the base portion 103. The support portion 180 comprises a free end 220 of the first support section 201 and a free end 420 of the second support section 401. Distances are provided between the free end 220 and the lateral portion 104 and between the free end 420 and the lateral portion 105, so that the free end 220 and the free end 420 are respectively easily deformed toward the lateral portions 104 and 105. When the pipe is inserted into the pipe holding clip 100, the deformation of the support portion 180 is also relatively easy, and the arrangement of the support portion 180 makes the pipe holding clip 100 have a relatively small insertion force.

As described above, the pipe holding clip according to the present disclosure has relative strong holding force, so that the pipe 501 cannot move easily in the axial direction of the pipe relative to the pipe holding clip 100. In some embodiments of the present disclosure, in order to move the pipe installed in the pipe holding clip 100 in the axial direction, an additional external force of 10-40 N needs to be applied to the pipe 501. At the same time, the insertion force required by the pipe holding clip 100 is relatively small, so that the pipe 501 can be easily installed into the pipe holding clip 100.

In one of applications of the present disclosure, the pipe holding clip 100 is configured to clamp vehicle brake oil pipes or other water pipes and air pipes, and these pipes have a plurality of interfaces. The pipe holding clip 100 is connected to a vehicle body of a vehicle, so that the pipe held in the pipe holding clip 100 is stable relative to the vehicle body, so as to prevent the situation that the pipe moves relative to the vehicle body during the operation of the vehicle, such movement will cause looseness and leakage at the interfaces.

Although only some features of the present disclosure are illustrated and described herein, those skilled in the art may make various improvements and changes. Therefore, it should be understood that the appended claims are intended to encompass all the above improvements and changes that fall within the substantial spirit and scope of the present disclosure.

The invention claimed is:

1. A pipe holding clip having a widthwise direction, a heightwise direction, and a lengthwise direction, the pipe holding clip comprising:
a base portion;
a pair of oppositely-arranged lateral portions, the pair of lateral portions being formed by extending upward from the base portion;
a pair of holding arms, the pair of holding arms respectively extending inward from the pair of lateral portions and extending toward the base portion; and
a support portion, two sides of the support portion being connected to the base portion or the pair of lateral portions, a distance being provided between the support portion and the base portion and between the support portion and the pair of lateral portions, the support portion having a working surface, and the working surface being in a shape recessed toward the base portion;
wherein the support portion is located below the pair of holding arms, and a space for clamping is formed between the pair of holding arms and the working surface, and
wherein the support portion comprises a first support section and a second support section, and the first support section and the second support section are arranged in the widthwise direction of the pipe holding clip, the first support section comprises a first arc-shaped working surface, the second support section comprises a second arc-shaped working surface, and a central axis of the first working surface and a central axis of the second working surface are staggered in the lengthwise direction of the pipe holding clip.

2. The pipe holding clip of claim 1, wherein
the first working surface has a first left side working surface and a first right side working surface, the second working surface has a second left side working surface and a second right side working surface, the first left side working surface and the second right side working surface are respectively located on two sides of the central axis of the first working surface and the central axis of the second working surface, and the second left side working surface and the first right side working surface are respectively located on two sides of the central axis of the first working surface and the central axis of the second working surface;
wherein the space for clamping is configured to accommodate the clamped pipe, and when the first support section and the second support section are in a free state, on a projection plane in the widthwise direction of the pipe holding clip, a maximum distance between the first left side working surface and the second right side working surface in the lengthwise direction of the pipe holding clip is smaller than a diameter of the clamped pipe.

3. The pipe holding clip of claim 2, wherein
two sides of the first support section are connected to the base portion or the pair of lateral portions, and two sides of the second support section are connected to the base portion or the pair of lateral portions.

4. The pipe holding clip of claim 2, further comprising:
a pair of first connecting portions and a pair of second connecting portions, wherein
the first support section is connected to the base portion or the pair of lateral portions through the pair of first connecting portions; and
the second support section is connected to the base portion or the pair of lateral portions through the pair of second connecting portions.

5. The pipe holding clip of claim 4, wherein
the first support section comprises a first support section left end and a first support section right end, at least one of the pair of first connecting portions is connected to the first support section at a position lower than a corresponding one of the first support section left end and the first support section right end, so that at least one of the first support section left end and a first support section right end of the first support section forms a first support section free end; and
the second support section comprises a second support section left end and a second support section right end, at least one of the pair of second connecting portions is connected to the second support section at a position lower than a corresponding one of the second support section left end and the second support section right end, so that at least one of the second support section left end and the second support section right end of the second support section forms a second support section free end.

6. The pipe holding clip of claim 5, wherein
the first support section has one first support section free end, the second support section has one second support section free end, and the first support section free end and the second support section free end are arranged on two sides of the central axis of the first working surface.

7. The pipe holding clip of claim 1, further comprising:
a reinforcing portion, the reinforcing portion being located below the support portion and connected to the support portion, a hollow space being provided between the reinforcing portion and the support portion, and a distance being provided between the reinforcing portion and the base portion.

8. The pipe holding clip of claim 2, wherein
in extending directions of both the central axis of the first working surface and the central axis of the second working surface, a distance is provided between the first support section and the second support section.

9. The pipe holding clip of claim 1, wherein
the pipe holding clip is integrally formed by using injection molding process.

10. A pipe holding clip, comprising:
a base portion;
a pair of oppositely-arranged lateral portions extending upward from the base portion;
a support portion having two sides connected to the base portion or the pair of lateral portions, the support portion including:
a first support section having a first arc-shaped working surface that defines a first central axis; and
a second support section having a second arc-shaped working surface that defines a second central axis,
the first central axis and the second central axis are staggered in a lengthwise direction of the pipe holding clip.

11. The pipe holding clip of claim 10, further comprising:
a pair of holding arms extending inward from the pair of lateral portions.

12. The pipe holding clip of claim 11, wherein the first and second support sections are arranged below the pair of holding arms.

13. The pipe holding clip of claim 10, wherein the first central axis and the second central axis are parallel.

14. The pipe holding clip of claim 10, wherein each of the first and second support sections include first and second sides that are connected to the base portion or the pair of lateral portions.

15. The pipe holding clip of claim 10, further comprising:
a pair of first connecting portions and a pair of second connecting portions that each connect the first and second support sections to the base portion.

16. The pipe holding clip of claim 10, wherein the first support section comprises a first support section left end and a first support section right end, at least one of a pair of first connecting portions is connected to the first support section at a position lower than a corresponding one of the first support section left end and the first support section right end, so that at least one of the first support section left end and a first support section right end of the first support section forms a first support section free end; and
the second support section comprises a second support section left end and a second support section right end, at least one of a pair of second connecting portions is connected to the second support section at a position lower than a corresponding one of the second support section left end and the second support section right end, so that at least one of the second support section left end and the second support section right end of the second support section forms a second support section free end.

17. The pipe holding clip of claim 10, wherein the first support section has one first support section free end and the second support section has one second support section free end, and
wherein the first support section free end and the second support section free end are arranged on two sides of the first and second central axes.

18. The pipe holding clip of claim 10, further comprising:
a reinforcing portion, the reinforcing portion being located below the support portion and connected to the support portion, a hollow space being provided between the reinforcing portion and the support portion, and a distance being provided between the reinforcing portion and the base portion.

19. The pipe holding clip of claim 10, wherein a distance is provided between the first support section and the second support section in an axial direction defined by the first central axis.

20. The pipe holding clip of claim 10, wherein the pipe holding clip is a unitary body.

* * * * *